Patented Sept. 29, 1931

1,825,241

UNITED STATES PATENT OFFICE

ALWIN MITTASCH, OF MANNHEIM, AND LEO SCHLECHT, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF METALS FROM THEIR CARBONYLS

No Drawing. Application filed March 18, 1929, Serial No. 348,120, and in Germany March 26, 1928.

The present invention relates to the production of metals from their carbonyls.

In the production of metals from their carbonyl compounds, the carbon monoxide combined with the metal is set free. This carbon monoxide may be used, in circulation, for the production of further amounts of metal carbonyls from metals, but in such an event it is observed that the formation of carbonyl is unsatisfactory and is often accompanied by sudden rises of temperature which damage the apparatus and impair the reactive capacity of the metal which is to react with the carbon monoxide.

We have now found that all these drawbacks are avoided if the carbon monoxide formed by the decomposition of the metal carbonyls is freed from injurious dusty, gaseous or vaporous impurities, and is only then used over again for the production of metal carbonyls, preferably in circulation. By the said purification, all impurities which give rise to the decomposition of carbon monoxide into carbon and carbon dioxide and which reduce the capability of metal to form metal carbonyl, are removed. With this object in view, it is important to free the gas from carbon dioxide, formed through the decomposition of the carbon monoxide, and also to remove the extremely fine metallic dust suspended in the gas which would cause the formation of further carbon dioxide in addition to carbon. The purification may be effected, for example, by the aid of scrubbing liquids or solid absorbents, or both. The metallic dust can also be removed by electrical means, such as the well-known Cottrell process, if desired.

The purification of the carbon monoxide, which in some cases may also be postponed, according to the nature and the amount of the impurities, until the gas has been used over again for some considerable time, becomes of particular importance when the decomposition of the carbonyl has been carried on in presence of other gases, such as hydrogen or ammonia, because in such cases the resulting carbon monoxide may contain, in addition to carbon dioxide, other constituents, such as hydrocarbons, cyanide compounds and the like, which are injurious to the subsequent formation of carbonyl.

The process according to our present invention is of particular advantage when the production of the carbonyl is carried on at ordinary pressure, or only slightly elevated pressure, since, under these conditions, the yield of carbonyl is far more seriously diminished by the impurities than when high pressures are employed.

The following example will further illustrate the nature of the invention, which however is not restricted thereto.

Example

Iron carbonyl vapor is decomposed at 280° centigrade in a heated chamber. The carbon monoxide formed in addition to iron contains 2 per cent by volume of carbon dioxide, which can be removed by means of burnt lime. When the purified carbon monoxide is passed, at 60° centigrade over metallic iron produced by the reduction of purple ore, the yield of iron carbonyl obtained per unit of time and space is about 40 per cent higher than when unpurified carbon monoxide is used.

What we claim is:—

1. In the production of metals by thermal decomposition of the corresponding metal carbonyl, the step of freeing the carbon monoxide, produced simultaneously with the metal, from carbon dioxide and metallic dust, and then acting therewith on further amounts of metal to produce metal carbonyl.

2. In the production of metals by thermal decomposition of the corresponding metal carbonyl, the step of treating the carbon monoxide, produced simultaneously with the metal, with a solid absorbent, thus removing carbon dioxide and metallic dust, and then acting with the purified gas on further amounts of metal to produce metal carbonyl.

3. In the production of iron by thermal decomposition of iron carbonyl, the step of freeing the carbon monoxide, produced simultaneously with the iron, from carbon dioxide and metallic dust, and then acting therewith on further amounts of iron to produce iron carbonyl.

4. In the production of iron by thermal decomposition of iron carbonyl, the step of treating the carbon monoxide, produced simultaneously with the iron, with a solid absorbent, thus removing carbon dioxide and metallic dust, and then acting with the purified gas on further amounts of iron to produce iron carbonyl.

5. In the production of iron by thermal decomposition of iron carbonyl, the step of treating the carbon monoxide, produced simultaneously with the iron, with burnt lime, thus removing carbon dioxide and metallic dust, and then acting with the purified gas on further amounts of iron to produce iron carbonyl.

In testimony whereof we have hereunto set our hands.

ALWIN MITTASCH.
LEO SCHLECHT.